Sept. 30, 1969      B. O. WEINSCHEL      3,470,462
LOW VSWR MEASUREMENT SYSTEM WITH SLIDING LOAD AND PROBE
Filed Oct. 8, 1964      4 Sheets-Sheet 1
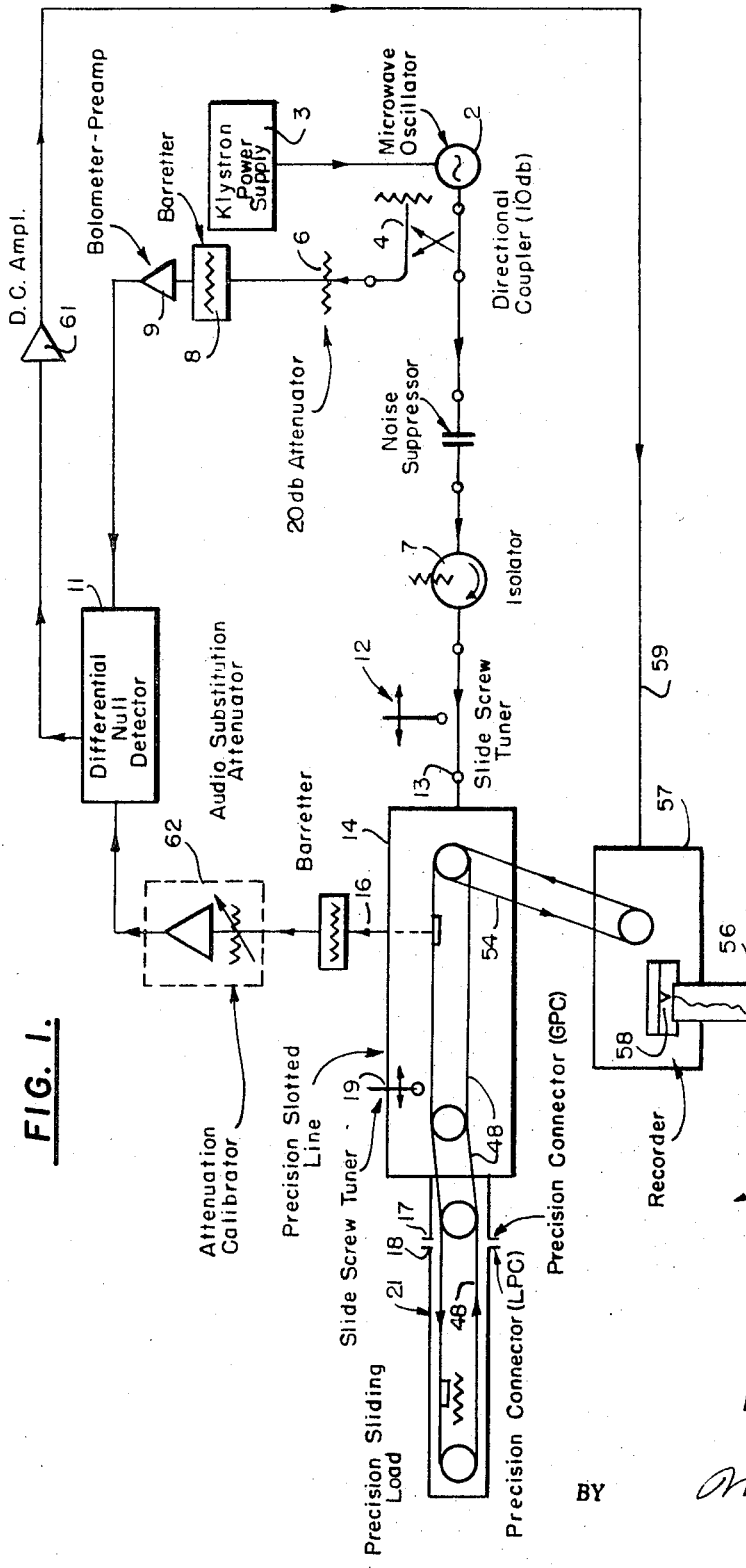
FIG. 1.
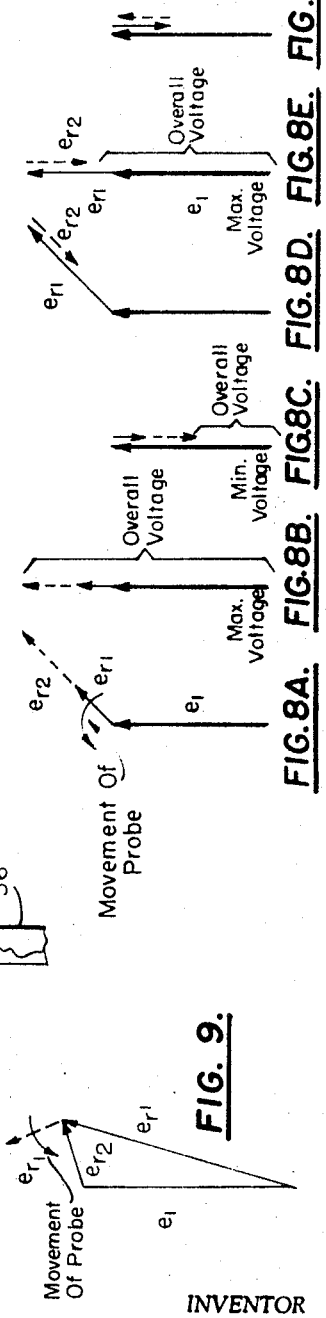
FIG. 8A.   FIG. 8B.   FIG. 8C.   FIG. 8D.   FIG. 8E.   FIG. 8F.
FIG. 9.
INVENTOR
Bruno O. Weinschel
BY    *Max L. Libman*
ATTORNEY

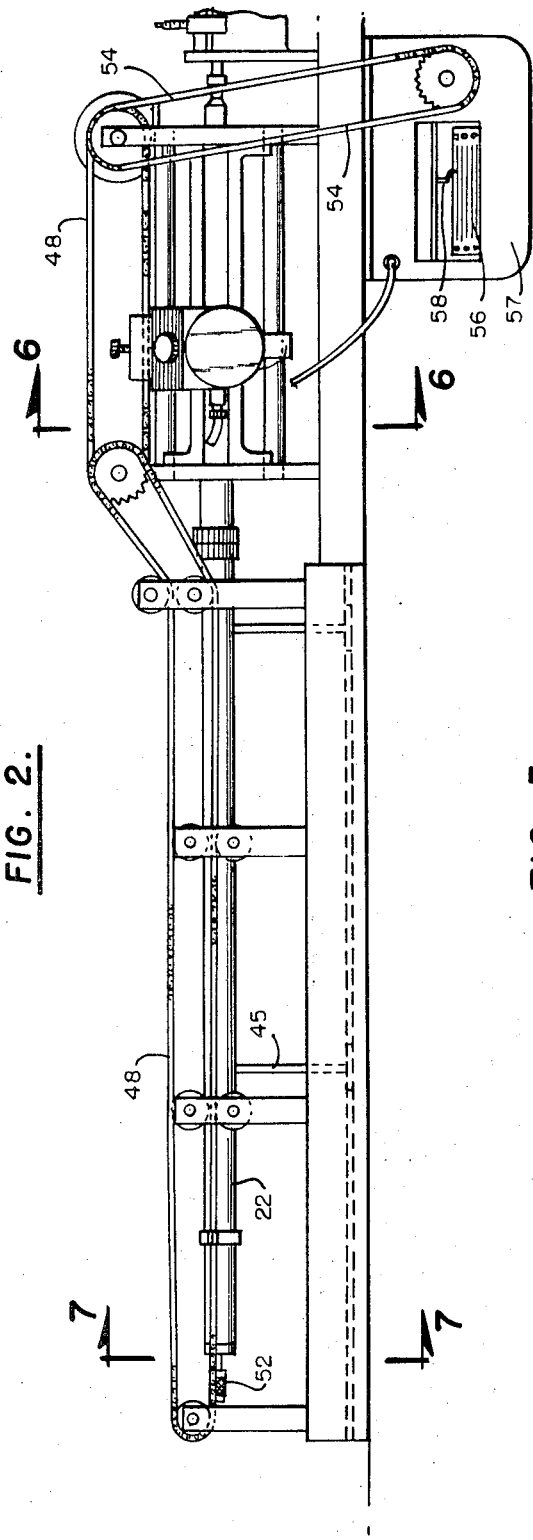
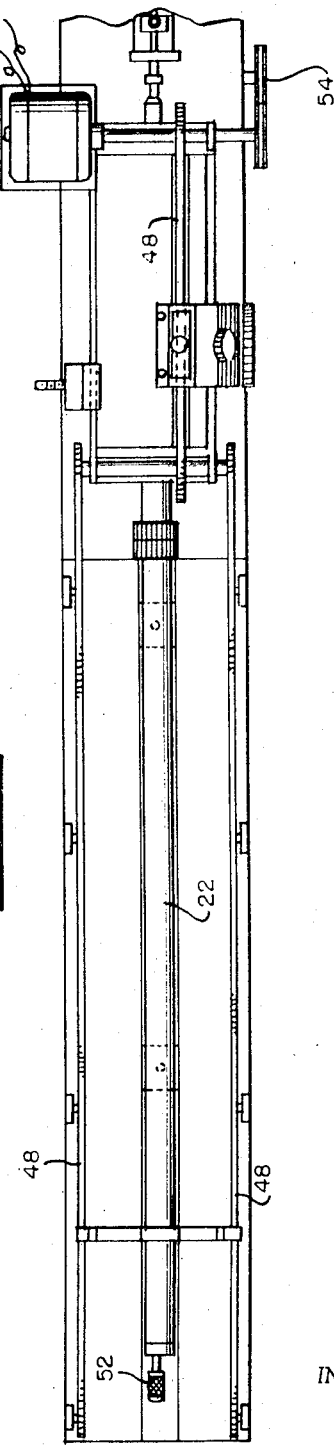

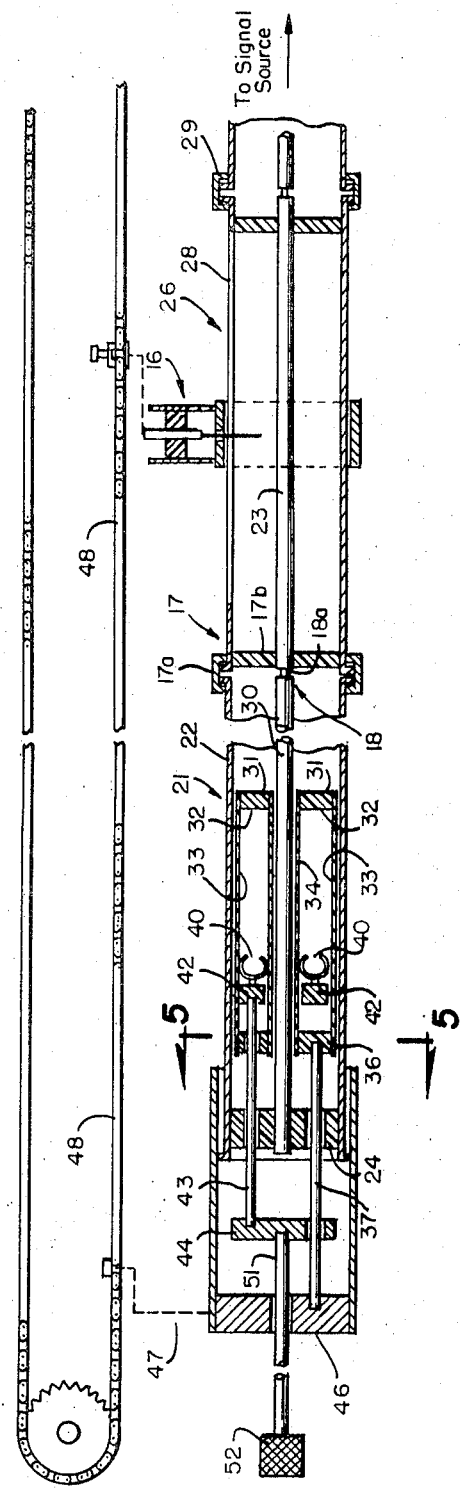

Sept. 30, 1969  B. O. WEINSCHEL  3,470,462
LOW VSWR MEASUREMENT SYSTEM WITH SLIDING LOAD AND PROBE
Filed Oct. 8, 1964  4 Sheets-Sheet 4

INVENTOR
Bruno O. Weinschel

BY  *Max L. Libman*
ATTORNEY

United States Patent Office 3,470,462
Patented Sept. 30, 1969

3,470,462
LOW VSWR MEASUREMENT SYSTEM WITH SLIDING LOAD AND PROBE
Bruno O. Weinschel, Bethesda, Md.; may be granted to United States Atomic Energy Commission under the provisions of 42 U.S.C. 2182
Filed Oct. 8, 1964, Ser. No. 402,578
Int. Cl. G01r 27/04
U.S. Cl. 324—58
9 Claims

ABSTRACT OF THE DISCLOSURE

Apparatus for accurate measurement of very low reflection coefficients of VSWR values at microwave frequencies, in which a slotted line for VSWR measurement is used with a precisiton coaxial line which is terminated in a sliding load, which is coupled mechanically to the slotted line probe so that the two move together, making it easily possitble to tune out the residual reflection without requiring a perfect load, the detected probe output is compared with the detected output of a directional coupler monitoring the incident power and the difference recorded on a strip recorder synchronized with the probe travel.

---

This invention relates to an improved system for the accurate measurement of very low reflection coefficients of VSWR values in microwave measurements, and has for its primary object the provision of a moderate-cost highly accurate measurement system capable of use over a very wide microwave frequency range.

In order to properly describe the invention, it is desirable to briefly explain the background and present state of the art. Present day requirements in the measurement of power, insertion loss measurements, attenuation measurement, impedance measurements, etc., at microwave frequencies require the evaluation in measurement of very low voltage standing wave ratios which are present in modern precision impedance measurements. The most frequently used measuring system for evaluating the VSWR of the microwave device is the well-known slotted line, which is a piece of a transmission line having the characteristics impedance of the transmission system and slotted on one side so that a slidable probe can be inserted and the R-F voltage along this transmission line portion can be plotted or measured. We assume that the characteristic impedance of this slotted line is exactly equal to the nominal value (for instance, 50 ohms) and the device whose impedance is to be measured is connected to the end of this slotted line; but if the impedance of this unknown device is not equal to the characteristic impedance of the slotted line, reflections will occur at the input of the unknown device. This means that part of the incident wave will be transmitted into the unknown device being measured, and part will be reflected. The reflected voltage now travels in a direction back to the generator. Since the incident voltage and the reflected voltage come from the same source, they are coherent, and will add vectorially. At points where the incident and reflected voltages are in phase, a maximum resultant voltage will be produced; where they are out of phase, a minimum resultant voltage will be produced. Therefore, the R-F voltage will vary along this slotted line in a generally sinusoidal fashion, and the ratio of the maximum voltage to the minimum voltage is a measurement of the amount of the reflection, as expressed by the reflection coefficient, and one can calculate at least the ratio of the transmitted power to the reflected power. The ratio of the maximum voltage so produced to the minimum voltage is called the voltage standing wave ratio (VSWR).

It is difficult to make very low VSWR measurements, i.e., measurements of a device whose impedance is very close to the characteristic impedance, because the irregularities of the line and the output portion of the transmission system tend to mask out or falsify the measurement. The irregularities are caused, for example, by the probe not moving smoothly along the inside of the slotted line, variation in the distance between the end of the probe and the adjacent slotted line surface, and so forth, so that if one seeks to measure the VSWR's below, for example, 1.02 to a very high accuracy, ordinary slotted lines are not sufficiently accurate to make such a measurement effectively. Another point causing residual reflections is the output connector of the slotted line. Practically all present microwave coaxial or waveguide connectors have residual internal reflections due to the supports of the inner conductors, variations in outside diameter and inside diameter, machining tolerances, gaps between the two center conductors, etc. These irregularities are defined by a number which is called "the residual VSWR" of a slotted line. A good commercial slotted line exhibits a residual VSWR of 1.04, typically, at about 4,000 megacycles. It therefore can be seen that VSWR measurements in the neighborhood of 1.02, 1.01, or even lower, were difficult if made in the ordinary way. A connector with a VSWR well below 1.01 has been developed and a measurement scheme described in a publication by Sanderson in "The Microwave Journal" of January 1962. This measurement technique uses a sliding probe which is mechanically coupled to a graphic recorder so that the two move together (although not necessarily at the same rate). Successive measurements are made and recorded upon the same record strip with and without a highly accurate impedance standard inserted between the slotted line and the load, and the difference between the successive measurements is taken. This method is quite accurate, but is subject to some drawbacks as will be indicated below, among them the requirement for an extremely expensive precision standard, which can be used for measurements only at a fixed frequency or multiples thereof.

The present invention obviates the requirement for the very expensive standard half-wave line section above described, and does not have its frequency limitation. According to the invention, a modified sliding load technique is used so that the length is not critical and the impedance can therefore be measured at any frequency. The use of a sliding load per se is known and described, for example, in "Microwave Measurements" by Edward L. Ginzton, McGraw Hill 1957, pp. 286, 287. In this method, a termination which is made as nearly perfect as possible is inserted into a device in such a manner that it can be moved forward or backward for at least one-half wave length without any change in its own reflection coefficient. This can be substantially accomplished in a good sliding load. Since there is a small reflection from the sliding load, this will now add to the reflected voltage due to the residual VSWR of the line, and will vectorially add to the incident voltage as before, if we assume the sliding load to be located at a place where it causes the maximum VSWR in the line. This is done in the following way: The probe of a slotted line is continuously moved and the sliding load is very smoothly withdrawn at a much slower rate; one can see, when this is done, that the VSWR as indicated by the probe meter will provide a maximum at a certain position and a minimum at another position. The maximum and minimum can now be used as a measure of the residual VSWR of the line and of the sliding load. As will be explained below, this technique also has certain drawbacks which are eliminated by the present invention. According to the present invention, a sliding load is employed, but instead of being independent of the slotted line, the sliding load, the probe of the slotted line, and the recorder are all coupled together so that the probe and the sliding load move together without any total change in electrical length between them, while the recorder output indicates the value of the measurement corresponding to each position of the probe during the measurement. After an initial adjustment which will be explained below, successive measurements are taken over the same record strip, both with and without the component being tested in the line, and from these measurements the VSWR can be determined to a very high degree of accuracy. If the sliding load is mechanically tied to the moving probe, the electrical length—assuming that both the slotted line and the transmission line in which the sliding load moves are air filled—between the load and the probe stays constant independent of the probe position. The residual reflection from the sliding load itself therefore will at the probe add a voltage vector, which will be constant in amplitude and phase even if the probe is moved since probe and load move together. The VSWR indicated by the probe therefore contains only the residual VSWR of the slotted line.

In the conventional sliding load measurement technique, three measurements are necessary:

(1) Measure maximum VSWR (as described above).
(2) Measure minimum VSWR (as described above).

The square root of the ratio of 1 over 2 gives the residual VSWR of the slotted line or the sliding load, whichever is smaller. The square root of the product of 1 times 2 gives the residual VSWR of the slotted line or the sliding load, whichever is larger. To determine which is the larger one, a third measurement is necessary.

(3) With the probe left constant at one place, the sliding load is moved, and the VSWR due to the moving load is measured. This is the residual VSWR of the sliding load. This measurement will agree either with the ratio or the product.

According to the present invention, only one measurement is necessary, which will directly give the residual VSWR of the slotted line.

The specific nature of the invention, as well as other objects and advantages thereof, will clearly appear from a description of a preferred embodiment, as shown in the accompanying drawings, in which:

FIG. 1 is a schematic block diagram showing the system as a whole;

FIGS. 2 and 3 are side and top views respectively of the mechanically coupled unit including the recorder, slotted line, and sliding load;

FIG. 4 is a sectional view taken on line 4—4 of FIG. 5 along the sliding load and slotted line;

FIG. 5 is a sectional view taken on line 5—5 of FIG. 4;

FIGS. 8A–8F and 9 are vector diagrams used in explaining the principle of operation of the invention.

Figure 6:
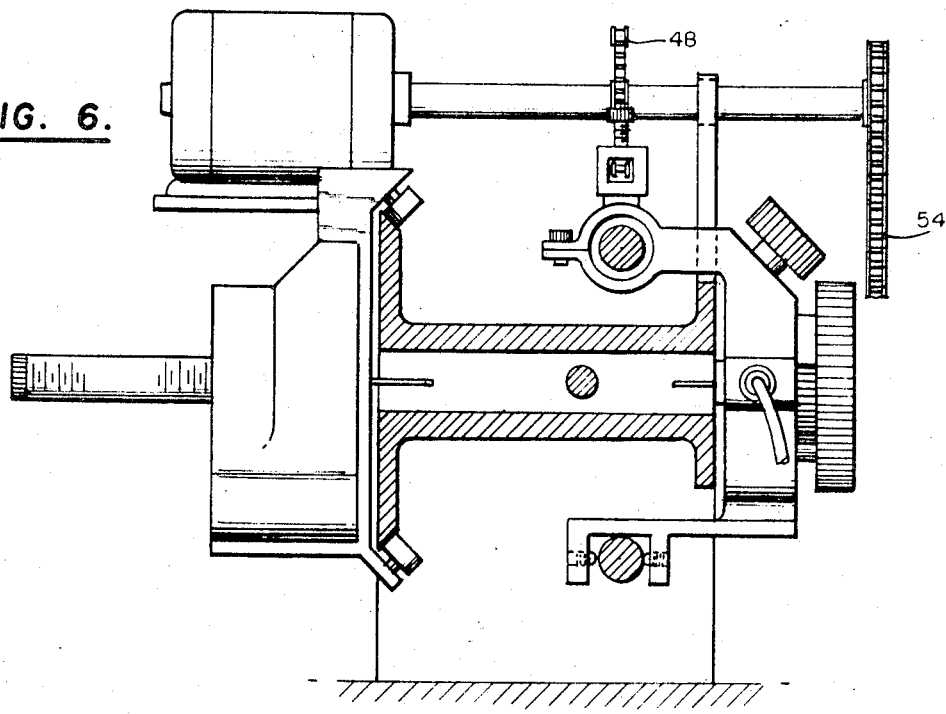
FIG. 6 is a sectional view taken on line 6—6 of FIG. 2.
Figure 7:
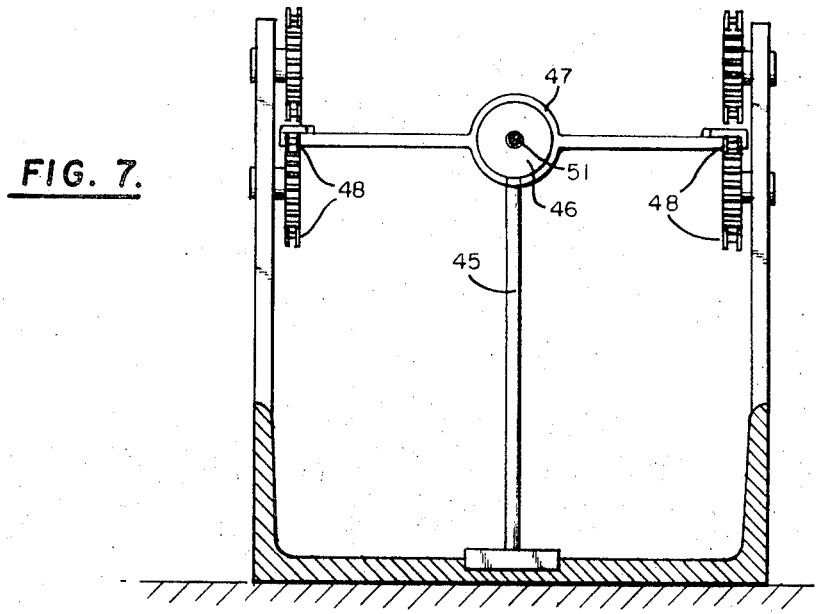
FIG. 7 is a sectional view taken on line 7—7 of FIG. 2.

The overall system will be briefly described by reference to FIG. 1, wherein microwave oscillator 2 supplied by a conventional klystron power supply 3, is connected to a 10 db directional coupler 4 which is used to split the R-F power into a measurement channel which goes into the slotted line via isolator 7, and a reference channel which goes through 20 db attenuator 6 into the reference barretter 8. The audio voltage out of the reference barretter 8 is proportional to the R-F power going into the barretter and is amplified by bolometer preamplifier 9. The signal then enters into differential null detector 11 which is commercially available equipment, e.g., Weinschel Engineering Co., Inc., Model ND–2.

In the measurement channel, the main output from the directional coupler goes through isolator 7, so that the output impedance of the generator available is reasonably well matched to the transmission line, and then the output goes through a slide screw tuner 12. Isolator 7 is a component which lets power go through in a direction away from the oscillator without appreciable attenuation, but greatly attenuates power going from the slotted line toward the oscillator. Ferrite isolators of this type are commercially available.

Slide screw tuner 12 is used to adjust the generator impedance as seen at interphase 13 between the slide screw tuner and the slotted line (looking back toward the generator) to be exactly equal to the nominal impedance of the transmission system. It is important that any energy which is reflected back into this interphase into the slotted line be prevented from causing additional reflections back and forth; and this requires that point 13 be perfectly matched to the transmission line. This can be easily adjusted because of the 30 db loss in the isolator 7. Microwave power from the oscillator is thus supplied to the slotted line 14. Any known slotted line can be used, it being necessary only that (1) the VSWR should be small enough so that in making the measurement described below it is not necessary to work with a small difference between two large quantities, which leads to inaccuracies; and (2) the probe carriage must be especially constructed to insure a constant output as the probe is moved along the slot, i.e., it should be highly repeatable to eliminate as far as possible uncertainty due to mechanical sloppiness which would swamp the 1.002 accuracy desired.

The output of the slotted line is supplied to two connectors 17 and 18, the first of which is a commercial precision connector, while the other is a laboratory precision connector of special construction, as will be explained with reference to FIG. 4. The commercial connector 17 schematically shown in FIG. 4 is provided with a conventional internal bead 17b for the purpose of supporting the center terminal, and a conventional screw shell for connecting the outer or grounded conductors. This is shown only schematically in the drawing, since such connectors are conventional. The bead 17b necessarily always causes some reflections which can be minimized by proper design, but cannot be eliminated entirely. The auxiliary slide screw tuner 19 will take care of this residual reflection from the bead. The precision connector 18 has no bead and has practically no residual reflection. The precision connector 18 has no bead which is normally employed in coaxial connector, and relies instead upon the bead 17b which is normally a part of the slotted line, to support the center conductor. A small internal mechanical connector 18a holds the center conductor 30 in accurate alignment with the center conductor 23 of the slotted line, maintaining as perfect continuity as possible, and eliminating the reflection from the customary bead, since there is now a straight unobstructed center conductor all the way back to the sliding load which is coupled to center conductor 30 as will be described below.

The sliding load section 21 comprises an outer conductor 22 electrically coupled as previously described to the outer conductor 28 of the slotted line 26. The sliding load is constituted by a disc resistance 31, which is a thin layer of resistive material on the disc surface of an insulating annular support member 32, which is in turn supported by and rigidly connected to two very thin-walled tubes 33 and 34 of conducting material. The resistive material 31 is electrically connected to both of these thin-walled tubes, and they in turn establish a sliding electrical connection between the outer and inner conductors of the coaxial section 21; however, in order to minimize contact difficulties, this connection is made capacitive rather than a normal conductive connection. This is accomplished by coating the outer surface of tube 33 and the inner surface of tube 34 with a very thin insulating coating, e.g., a Teflon sleeve or coating is applied to each of these surfaces. Teflon is a very suitable material because of its good electrical qualities, and because it slides very smoothly and without binding. At microwave frequencies, due to the large facing areas of tubes 33 and 34 with their respective conductors, and also to the thinness of the insulating layer, the electrical impedance of the sliding connection is negligible. At the outboard end (remote from the slotted line) of tubes 33 and 34, there is provided a mechanically strong annular spacer 36 which is rigidly fastened to both of these tubes, and, together with insulator 32, maintains the sliding load with its two tubes as a mechanical unit. A rod 37 is firmly fixed at one end to spacer 36 and at the other end to a follower 46 to which is fixed a yoke 47 which can be attached at its free ends to a chain 48 to which the carriage of the probe 16 is also attached, so that the sliding load and probe can be moved in unison. Rod 37 passes freely through an aperture in the end plug 24 of the coaxial line section 21. Although only one rod 37 is shown in FIG. 5 for clarity, and in principle one such rod would be sufficient to move the sliding load, in practice, three such rods arranged at the apices of an equilateral triangle are used, as shown in FIG. 5, thus forming a rigid structure, so that when post 47 is moved by the chain 48 as will be described below, the entire sliding load assembly moves freely within the coaxial section 21.

As will be described below, it is necessary to have an adjustable short circuit between tubes 33 and 34 outboard of the load 31, and for this purpose a sliding short 40 is provided, which may be in the form of a series of spring elements biased into engagement with the facing inner surfaces of tubes 33 and 34, or may be of any suitable construction. A sliding short 40 is carried on an annular metallic spacer 42 to which is fixed a rod 30 supported at its other end by a metal disc 44 so arranged that it can slide freely on rod 37 previously described. A shorting control rod 51 is fixed to the disc 44 at one end, and is provided with an adjustable knob 52 at the other end, whereby the position of the short within the assembly of tubes 33 and 34 can be adjusted; once this adjustment is made, it will be noted that the entire assembly including the shorting element, moves as a unit when post 47 is moved either to the right or left. Thus the adjustment of the short with respect to the load is not changed by movement of the sliding load relative to the coaxial line section 21. As shown in FIG. 5, there are preferably three such rods 43, for greater mechanical stability.

As shown in FIG. 1, chain 48 is coupled to chain 54 which drives a tape 56 of recorder 57 so that the record made on the tape corresponds to the movement of the sliding load and the probe. The pin 58 which traces the record is, of course, driven in the usual fashion in accordance with the input on line 59 from differential null detector 11 after suitable amplification in D.-C. amplifier 61.

The procedure in making the measurement is as follows: First the sliding load 31 is attached to the line, and the shorting element 40 is adjusted until a minimum VSWR on the slotted line is obtained, with post 47 disconnected from chain 48, by simply observing a meter (conventionally supplied with the equipment) which has a VSWR scale on it and which will vary as the short is adjusted. When this variation is a minimum, then the sliding load and the slotted line are connected mechanically into the chain 48 (which was previously disconnected) and a test run is made by driving the probe along the slotted line and recording the output on the tape record 56. The differential null detector 11 is then set approximately to zero, there being some residual VSWR in the system at this time. Now the auxiliary slide screw tuner 19 is adjusted until this residual VSWR is reduced as much as possible, which can readily be done by an experienced operator. Since the residual VSWR only is displayed on the meter, it can be easily tuned out by adjusting the slide screw tuner until the operator feels that only the random function remains. The above procedure is now repeated until essentially only random variations are left, then the set-up is ready for measurement. Now a component to be tested can be inserted between the two precision connectors 17 and 18, and the VSWR measured by using known audio substitution attenuator techniques of the attenuation calibrator 62.

The reason for the short-circuiting unit will now be explained. The resistive disc constituting the termination is not a purely resistive device, but at microwave frequencies shows also a reactive component. The movable short 17 is adjusted to tune out the reactance at the measurement frequency; since the reactance is normally small compared to the resistance of the load, the electrical distance between the short and the active layer of the load disc is a quarter-wave length long. In order to make sure that the reflection coefficient of the sliding load has no influence, the load and the probe are connected together. But this method assumes that during the sliding procedure, the small reflection coefficient from the load stays constant—if this does in fact vary, not only in amplitude, but particularly in phase, due to the grounding and shorting arrangement of the apparatus, there would again be a variation of the phase which would violate this basic assumption. Therefore, the sliding load must be constructed very carefully to keep the reflection coefficient as constant as possible, rather than keeping it as small as possible. It is therefore essential that the sliding load unit comprises an excellently machined airline which is used as an impedance reference. In this airline, the movable load will slide, this being the ceramic disc 32 coated with a resistive layer 31 which absorbs the microwave energy. The movable short is also used as a reflective shield to avoid R-F leakage through the back end of the sliding load arrangement. To make this shielding more effective a poly-iron microwave attenuator may be inserted behind the movable short. When the terminating load is moved, the short must move with it in order not to change its relationship, and this is the purpose of the mechanism shown in the drawing. If the sliding load were shorted directly to the transmission line, fluctuations in the contact resistance could cause residual reflections, and to avoid this, the non-contacting plunger-type movement is used to insure that the reflection coefficient always stays constant with movement of the load.

Referring to the FIGS. 8A–8F, the vector $e_1$ represents the incident voltage vector; the vector $e_{r1}$ represents the reflected voltage vector caused by the device under test or by the residual reflection of the slotted line; the vector $e_{r2}$ represents the reflected voltage vector of the sliding load.

FIG. 8 shows the operation of the normal "sliding load measurement" as previously known. In this case, the sliding load is typically moved to the maximum VSWR location and then to a minimum VSWR location. We first draw the incident voltage vector $e_1$ in a fixed phase position as shown in all of the FIGS. 8A–8F. We assume the phase changes to occur between this fixed incident voltage vector and the two reflection voltage vectors, one being caused by either the device under test or by residual VSWR which we want to measure, the other being caused by the sliding load. If, for example, the sliding load is adjusted to obtain maximum VSWR, the two reflected voltage vectors, $e_{r1}$ due to the residual of the line (or the unknown) and $e_{r2}$ the reflection from the sliding load, are assumed to be in phase. Now the maximum voltage will occur when all three are in phase. Vectors $e_{r1}$ and $e_{r2}$ will always be in phase with each other because they are stationary and the physical movement of the probe will change the difference between the pickup of the voltage and the physical location of the two reflection points. The change in phase is proportional to the physical distance between the probe and the points of reflection. (Actually, the whole should be multiplied by a factor proportional to the velocity of the electromagnetic wave, but this can be assumed to be constant for our purpose.)

The minimum voltage will occur where the reflection voltage vectors are 180° out of phase with the incident voltage vector $e_1$, as shown in FIG. 8C. If we move the sliding load so that $e_{r1}$ and $e_{r2}$ are as shown in FIG. 8D, the overall maximum voltage as shown in FIG. 8E will be smaller than in FIG. 8B, and obviously the overall minimum voltage will be greater in the case of FIG. 8C, as shown in FIG. 8F. The ratio of maximum to minimum for 8B and 8C is much larger than the maximum-minimum ratio in FIGS. 8E and 8F. Thus by moving the sliding load from the first position to the second position we get two VSWR's—a maximum and a minimum VSWR, and using the formulas as shown before, we can calculate the actual VSWR of the line or the residual VSWR of the device under test and the residual VSWR of the sliding load.

Now, if we couple the sliding load and the probe together as shown in FIG. 2, then there is always a fixed phase relationship between the incident voltage and the voltage reflected from the sliding load because the distance between these stays constant, as shown in FIG. 9. Only the phase of $e_{r1}$ with respect to the constant phase of $e_1$ plus $e_{r2}$ is changing. Now we can combine $e_1$ and $e_{r2}$ into the resultant vector $e_{r'}$, and the variation due to $e_{r1}$ is all that we get. This means therefore that regardless of the VSWR of the sliding load, the sliding load influence falls out for the ratio of the maximum voltage (where $e_{r1}$ is a phase with $e_{r'}$) and the minimum voltage (where $e_{r1}$ is out of phase with $e_{r'}$). $e_{r2}$ has no appreciable influence on the result because $e_1$ is usually about a hundred times greater than $e_{r2}$, so $e_{r2}$ affects the result very little. Mechanical coupling eliminates the reflection of the sliding load entirely. The important requirement is that $e_{r2}$ must stay constant when the probe and the sliding load are moved together.

It will be apparent that the embodiments shown are only exemplary and that various modifications can be made in construction and arrangement within the scope of my invention as defined in the appended claims.

I claim:

1. Apparatus for the measurement of very low VSWR comprising:
    (a) a microwave conductor circuit terminating in a sliding mainly resistive load having a small reflection coefficient,
    (b) a slotted line having a slidable output probe, said line being connected to said microwave conductor circuit,
    (c) generator means for supplying microwave frequency to said slotted line and said microwave conductor circuit,
    (d) measuring means connected to the output probe of the slotted line, and
    (e) fixed mechanical coupling means for coupling the sliding load and the slidable output probe for joint simultaneous movement as a unit.

2. The invention according to claim 1, and
    (a) recorder means for recording the output of said measuring means, said recorder means including record drive means,
    (b) further mechanical coupling means for coupling said record drive means with said sliding load and probe for joint simultaneous movement as a unit.

3. The invention according to claim 1, said measuring means comprising
    (a) a reference channel supplied from said generator means,
    (b) differential null detector means for comparing the output of said reference channel with the output of the probe and supplying a resulting signal from said comparison to said measuring means.

4. The invention according to claim 1, said mechanical coupling means comprising a linear chain drive.

5. The invention according to claim 1, and a slide screw tuner between the energy source and the slotted line.

6. Apparatus for the measurement of very low VSWR comprising:
    (a) a microwave conductor circuit terminating in a sliding load;
    (b) a slotted line having a slidable output probe, said line being connected to said microwave conductor circuit;
    (c) generator means for supplying microwave frequency to said slotted line and said microwave conductor circuit,
    (d) measuring means connected to the output probe of the slotted line,
    (e) mechanical coupling means for coupling the sliding load and the slidable output probe for joint simultaneous movement as a unit,
    (f) said conductor circuit comprising an axially extending center conductor and an outer conductor coaxial therewith and radially spaced therefrom,
    (g) a first tubular conductive sleeve externally fitted about said center conductor and axially slidable thereon,
    (h) a second tubular conductive sleeve internally fitted within said outer conductor and axially slidable therein, and mechanically fixed to said first sleeve for sliding motion therewith as a unit,
    (i) a load resistance fixed between said first and second sleeves for motion therewith,
    (j) an axially movable shortening element so located as to short any microwave energy which passes beyond said load from said source, and
    (k) means for axially adjusting said shorting element with respect to said load.

7. The invention according to claim 6, comprising
    (a) mechanical operator means extending rearwardly from said sleeves and fixed thereto at one end for slidably moving said sleeves and load resistance as a unit within the coaxial conductor,
    (b) connecting means for connecting said operator means to said mechanical coupling means.

8. The invention according to claim 7, said shorting element being located between said sleeves and movable therewith while maintaining its axially adjusted position with relation thereto.

9. The invention according to claim 6, and a thin coating of low-friction insulating material between said sleeves and their adjacent coaxial conductors to prevent D.-C. conductive contact while readily passing microwave energy.

References Cited

UNITED STATES PATENTS

| | | | |
|---|---|---|---|
| 2,530,248 | 11/1950 | Larson | 324—58 |
| 2,617,853 | 11/1952 | Gilmer | 324—58 |
| 2,701,861 | 2/1955 | Andrews | 324—58 |
| 2,748,245 | 5/1956 | Phillips | 324—58 |
| 3,025,463 | 3/1962 | Luoma et al. | 324—58.5 |

OTHER REFERENCES

The Microwave Journal, Sanderson, January 1962, pp. 69–73.

Microwave Measurements, E. L. Ginzton, McGraw-Hill, (1957), pp. 286–287.

RUDOLPH V. ROLINEC, Primary Examiner

P. F. WILLIE, Assistant Examiner